May 28, 1968 L. A. SHEERAN 3,385,406
SPRING CLUTCH MECHANISM

Filed May 18, 1965 3 Sheets-Sheet 1

INVENTOR.
LLOYD ALAN SHEERAN
BY
Barlow & Barlow
ATTORNEYS

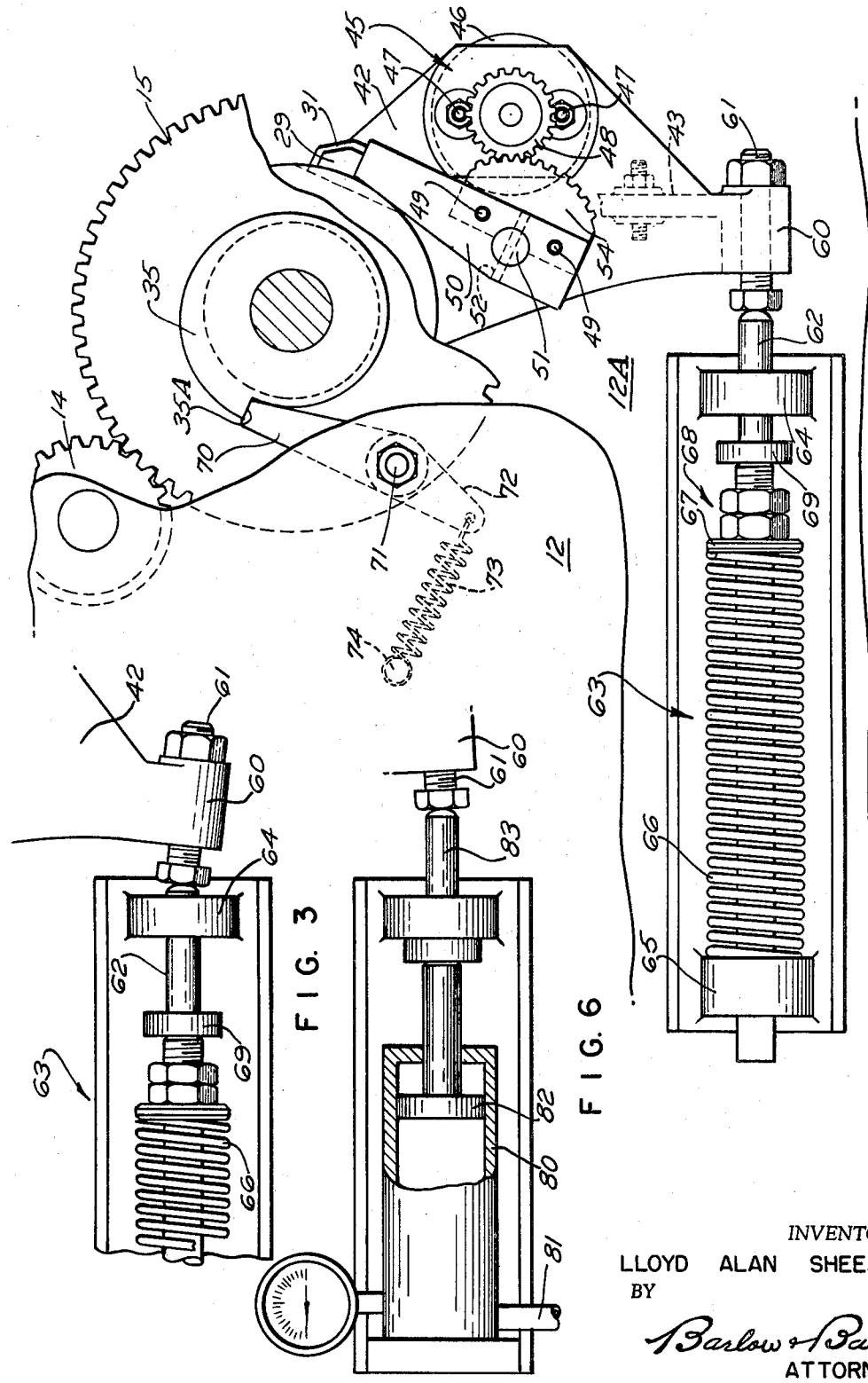

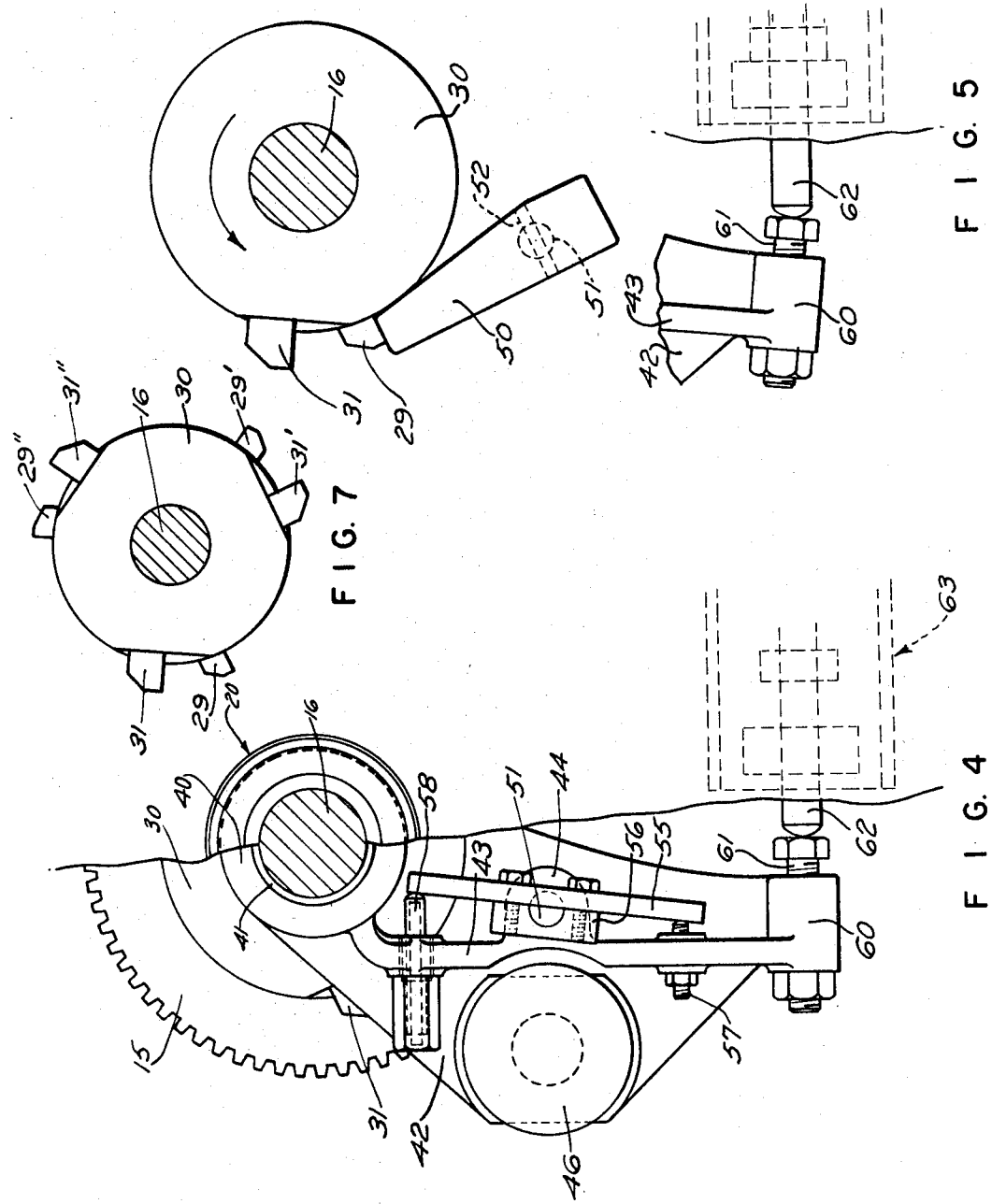

United States Patent Office 3,385,406
Patented May 28, 1968

3,385,406
SPRING CLUTCH MECHANISM
Lloyd Alan Sheeran, St. Petersburg, Fla., assignor to Rite-Size Corrugated Machinery Co., a corporation of Rhode Island
Filed May 18, 1965, Ser. No. 456,734
7 Claims. (Cl. 192—41)

ABSTRACT OF THE DISCLOSURE

A spring clutch mechanism adapted for use with a continuously rotated drive shaft to produce an intermittent drive of the output mechanism.

Background of the invention

Clutch mechanisms which can be engaged on demand by an operator or through automatic control means are broadly well known and briefly consist of a coil in the form of a spring, one end of which would be associated with an input and the other end of which would be associated with an output. The spring in its unenergized condition will grip the input and output drums which are formed internally of the spring so as to transmit torque. Disengagement of a mechanism of this type is effected by arresting the rotation of one of the drums to expand the coil so that at least one end thereof will move out of gripping relationship. In clutches of this type the mechanism decelerates from a certain attained velocity to zero velocity usually in an extremely short space. Expressed in terms of angular rotation or radians, it is often desirable to control a clutch movement in precise amounts so that one can have on the output shaft a single rotational output or a plurality of rotative outputs as may be demanded. Stopping, however, of an output device such as this necessarily involves a considerable inertia that may be built up under the rotation of the clutch mechanism.

Summary

This invention provides a clutch mechanism which will maintain a work producing member in a precise and angular position when at rest and includes constant velocity acceleration and deceleration of the work producing member in a very short angular rotation, the rotary output member coming to rest at repeatable angular positions.

Brief description of drawings

FIG. 2 is an end elevational view of the mechanism with certain parts broken away for clarity;

FIG. 3 is a sectional view of a portion of FIG. 2 showing a different position of the parts;

FIG. 4 is an elevational view showing a detail of the decelerating apparatus looking in the opposite direction from FIG. 2;

FIG. 5 is a diagrammatic view showing the rest position and the engagement of the clutch release toe with the stopping detent just prior to the deceleration portions being engaged;

FIG. 6 is a sectional view of a modified form of recoil device; and

FIG. 7 is a sectional view of a modified form of toes.

Description of preferred embodiment

Figure 1:
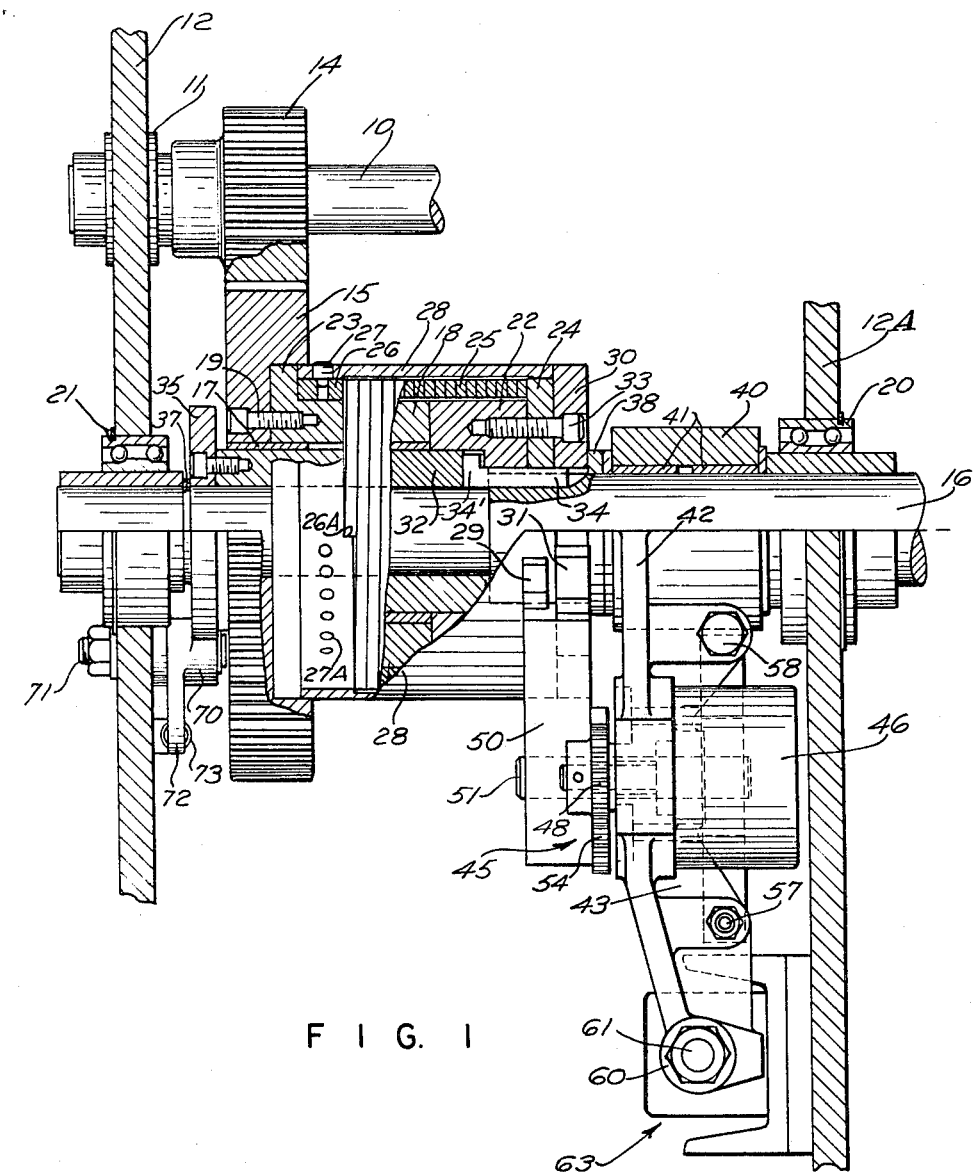
FIG. 1 is an elevational view partly in section of the spring clutch mechanism of the invention.

More simply stated, the objects of this invention are obtained by providing a spring clutch mechanism with an inertia absorbing clutch disengaging means together with a positive stopping dog mounted on the clutch to arrest movement at a precise angular location. Generally in mechanisms of this type, as with the instant apparatus, the load generally has considerable inertia, and since the output drum of the spring clutch is connected with spring coils, provision is made here to prevent excessive uncoiling movement of the clutch spring and further provision to prevent shock to part or all of the mechanism upon release of the clutch.

Referring now to the drawings, 10 indicates an input shaft from a suitable power source not shown which is mounted and supported by bearings as at 11 in a supporting frame indicated at 12. The input shaft 10 has mounted thereon a spur gear such as 14 which is in driving engagement with another spur gear 15 that is mounted for rotation on bearings 17 which may take a variety of forms and are herein shown for simplicity sake in solid cross-hatched designation. The driven gear 15 is secured to the driving drum 18 so that both gear 15 and drum 18 are rotatably mounted about the output shaft 16 over the bearings 17 and by way of example the rigid securement is shown by means of recessed cap screws 19. This assembly consisting of the input gear 15 and the input drum 18 is thus free to revolve about the bearing 17 and will normally run continuously at a constant speed about the output shaft 16.

The output shaft 16 is supported between the mounting wall 12 and the mounting wall 12A in ball bearings designated at 20 and 21. Received on the shaft is an output drum member 22 which is keyed thereto for common rotation by key 34. The input drum member 18 and the output drum member 22 have their peripheral surfaces formed preferably of equal diameters. The input drum 18 has a shoulder 23 and the output drum 22 has an end plate 24 between which is mounted or located a clutch spring 25. The internal diameter of the spring 25 when the spring 25 is in a relaxed condition is generally of a smaller diameter than the outside peripheral diameter of the drums 18 and 22. Accordingly, the spring 25 is self-energizing on both of the drums 18 and 22. To effect deenergization of the spring, one end thereof abuts a shoulder (not shown) on the output drum 22 while the other end thereof abuts shoulder 26A on the release adjustment plate 26 which in turn is secured to release drum 28 by a screw 27 engaging one of the apertures such as 27A whereby adjustment may be had. On the periphery of the release drum 28 is a toe 29 (FIGS. 1, 2 and 5) and at the end of the release drum 28, and in sliding engagement therewith, is an end plate 30 which has provided on the periphery thereof another toe 31 of a greater radial extent than toe 29 so that toe 29 will be released first as hereinafter will be apparent. The complete output mechanism, therefore, consists of the release drum 28, the output drum 22, the drum end plate 24 and the release drum end plate 30, the last three of which are secured together as by a number of recessed cap screws such as at 33 and keyed to the shaft 16 by a key 34. A cam 35 is secured to the sleeve 32 which in turn is keyed to shaft 16 by the end 34' of key 34 so as to rotate therewith, and the above described assembly is retained between a retaining ring 37 and a spacing plate 38.

Surrounding the output shaft 16 is a sleeve 40 having an internal bearing 41. On the sleeve 40 there is a recoil arm 42 extending in a plane at right angles to the axis of shaft 16 and which arm carries rib 43. As seen best in FIG. 2, there is mounted on this recoil arm 42 a release assembly or trigger assembly generally designated by the numeral 45. The assembly is made up of a rotary type solenoid 46 that is fastened to the arm 42 as by the securing means 47 and which has on the output shaft thereof a sprocket gear 48. Gear 48 meshes with a sector gear 54 secured as by screws 49 to a stop pawl 50 that in turn is pinned to a shaft 51 by a pin 52, the shaft 51 being suitably received in a bore that extends into a boss 44 (see FIG. 4) on arm 42.

Mounted on the end of shaft 51 is a rocker arm 55 (FIG. 4) which is secured to the shaft 51 by a split collar means 56. The ends of the arm 55 abut adjusting screw means 57 in rib 43 extending from arm 42 and spring loaded pin means 58 also in this rib 43 so that effectively the rotational position of shaft 51 and consequently the position of stop pawl 50 may be controlled by adjusting screw means 57.

On the end of arm 42 is an enlargement 60 in which an adjusting stud 61 is located, the head of which engages a pin 62 of a retarding force recoil member 63. The retarding recoil member 63 basically consists of a pair of bushings 64, 65 (see FIG. 2) in which the pin 62 is adapted to reciprocate. Surrounding the pin 62 and abutting the bushing 65 is a compression spring 66, the other end of which abuts a washer plate 67 that is held in position on the pin 62 by a pair of lock nuts generally designated 68. By adjustment of the nuts 68, the spring 66 is normally compressed in the rest position illustrated in FIG. 2. A stop collar 69 slidably embraces a portion of smaller diameter than the threaded portion and may abut the shoulder formed by the reduction. Thus the established static compression will exercise a force against the arm 42 to maintain a rest position of the device and engagement of the stop arm 50 with the toe 29 and toe 31.

Cam plate 35 previously referred to is effectively a reverse rotation detent which is normally engaged by a latch arm 70 that is pivoted on a stud 71 received in the supporting frame 12. To maintain engagement of the end of the arm 70 with the surface 35A of the cam 35, the free end of the arm 70 as at 72 has a spring 73 affixed thereto, the other end of which is mounted on a stud 74 received on the mounting frame 12 so that normally a rotational force is exerted on the arm 70. The recoil spring 66 is exerting a counter-rotative force which exerts a pressure to force cam 35 into sustained contact with latch arm 70 and therefore functions as a stop. Movement of the clutch output members is therefore locked-in providing positive positioning.

To understand the operation of this mechanism, let us first assume that the solenoid 46 is energized, thereby rotating the sector gear 54 and in turn the shaft 51. This will rock the stop pawl 50 out of position, and the following things will occur in this order: First, the release toe 29 will be released. The toe 29 is affixed to release drum 28 and one end of spring 25 is secured thereto. Accordingly, when the arm 50 moves out of engagement with this toe 29, the pre-energized spring 25 will grip the drums 18 and 22, as the release drum is free to rotate. Since stop toe 31 extends radially further from plate 30 than release toe 29 extends from drum 28, the spring 25 is firmly seated into a full torque gripping contact with the drums while the output members are still restricted from rotation by the incremental continuance of detenting by stop toe 31 against the stop arm 50. Second, the stop toe 31 will be released. This release does not occur until the drive is positively engaged and the output is in positive torque drive. This sequence is not critical since the entire rocker arm can rotate to the amount that the drive torque exceeds the recoil spring reactive force. It does guarantee that the output is in positive torque posture. Accordingly, with the spring being allowed to come in contact with the drums 18 and 22, energy will be transmitted from the input member to the output member.

Assuming now that a number of revolutions are desired of a predetermined magnitude, control mechanism, which is not part of this invention, will reactuate the solenoid rotating the stop pawl 50 into a position where it may engage the toes 29 and 31. Accordingly, as the parts come around into stopping position, it will be found that the arm 42 has now angularly rotated to a position as is illustrated in FIG. 5 of the drawings by the static compression of spring 66. At this position the toe 29 which is associated with the release drum 28 will first be contacted as the entire assembly rotates counterclockwise as viewed in FIG. 5. The end of the clutch coil will be rotated a certain number of degrees and essentially partially unwound. This increases its inside diameter and removes it from gripping contact with the outside of drums 18 and 22. By this time the toe 31 comes into mechanical contact with the stop arm 50 whereupon the product of the mass and velocity of the shaft 16 and its associated parts will be transferred as a force onto the arm 42 and thence into the energy-absorbing mechanism 63. This will tend to compress the spring 66 as the arm 42 rotates counterclockwise as viewed in FIG. 5. As the spring is compressed, it will be apparent that if suitable adjustment is had, the arm 42 will overtravel from its normal rest position into full compression of spring 66 as shown in FIG. 3. This now permits the arm 70, which has been riding on the cam surface of cam 35, to fall in behind the cam stop surface 35A. As the spring 66 unloads into rest position, the rest position will accordingly be maintained by abutment of the arm 70 with the surface 35A as seen in FIG. 2. Effectively then the recoil of the spring overcomes the mass inertia of the static mechanism and activates it slightly into reverse rotation that is terminated by positive restraint thru arm 70.

Assuming now that increments of a single revolution of a predetermined magnitude are desired, a multiplicity of toes, 29, 29′, 29″, 31, 31′ and 31″ may be affixed to their associated members in the desired and relative angular relationships as seen in FIG. 7. The solenoid, when momentarily energized by the controls, which are not part of this invention, raise stop pawl 50 sufficiently long enough to release the toes and permit their passage. The stop pawl is then returned to stop position prior to the arrival of the toes 29 and 31 at that position. Thus a predetermined cycle of rotation is established by the fixed angular positioning of the toes, whether less than a revolution when a multiplicity of toes are employed, or a single revolution where a single set are used. Multiples of these predetermined radians of angular relationship are obtained by setting of the controls to provide an energizing of the solenoid which is sustained for a period sufficient to reposition the pawl 50 in stop position just prior to arrival of the toes at that position.

It will be apparent from the foregoing that this mechanism is useful in indexing an output shaft a certain number of revolutions and provides a mechanism which will permit the device to come to a complete stop at a predetermined location absorbing all of the mass inertia of the mechanism and permitting positive release of the clutch spring. Accordingly, the load shaft will never have any amount of overrun save for the small amount of movement that is required to permit latching of the reverse latch arm 70.

Other recoil means may be provided such as shown in FIG. 6 in which an air cylinder 80 may have supplied to it by conduit 81 air under a sufficient pressure to force a piston 82 with a pin 83 into engagement with stud 61 to maintain a pressure thereon and yet yield as the inertia of the rotating parts apply pressure against it.

I claim:

1. A coil clutch mechanism comprising an input clutch drum adapted to be unidirectionally driven at a predetermined speed, an output clutch drum mounted coaxial therewith, a helical clutch spring having coil portions resiliently in engagement with said drums, shoulder means on one drum engaging one end coil of said spring, a release drum, said release drum having means engaging the other end of said clutch spring and having a toe on the periphery thereof, said output clutch drum having a toe on the periphery thereof, said toes being juxtapositioned to each other, and stop means common to both toes operable to engage and release engagement with said toes sequentially.

2. A clutch mechanism as in claim 1 wherein the input clutch drum has a cam mounted thereon, said cam being provided with an abutment shoulder and a pivoting latch member mounted to engage said shoulder, said cam preventing reverse rotation of said output clutch drum.

3. A clutch mechanism as in claim 1 wherein said stop means is coupled to an inertia absorption means.

4. A clutch mechanism as in claim 1 wherein there are a plurality of toes at different angular radians for selective engagement with the stop means.

5. A clutch mechanism as in claim 1 wherein said stop means comprises a stop lever pivotally mounted on an axis substantially parallel to the axis of said input and output drums in a position to normally engage said toes and means to pivot said stop lever in and out of engagement with said toes.

6. A clutch mechanism as in claim 5 including inertia absorption means comprising a compression spring and an arm is rotatably received on said output shaft adjacent said output clutch drum, said stop lever being pivotally mounted on said arm on an axis substantially parallel to said output shaft and movable into engagement with said toes, the end of said arm engaging an end of said compression spring.

7. A clutch mechanism as in claim 5 wherein said toe on the release drum is radially shorter than the other toe whereby the clutch spring may be permitted to go into driving engagement with said input and output clutch drums before release of the output clutch toe.

References Cited

UNITED STATES PATENTS

| | | |
|---|---|---|
| 1,898,139 | 2/1933 | Nordin. |
| 2,442,401 | 6/1948 | Dabrasky et al. |
| 2,968,380 | 1/1961 | Sacchini et al. _____ 192—81 |
| 3,034,624 | 5/1962 | Walker _____ 192—81 |
| 3,062,345 | 11/1962 | Cruzen _____ 192—81 |
| 3,104,745 | 9/1963 | Wipke _____ 192—81 |
| 3,186,530 | 6/1965 | Petroff _____ 192—26 |

FRED C. MATTERN, JR., *Primary Examiner.*

DAVID J. WILLIAMOWSKY, *Examiner.*

C. J. HUSAR, *Assistant Examiner.*